12,335,159
PROCESS FOR PREPARING DIORGANO
ANTIMONY (III) CARBOXYLATES
Nathaniel L. Remes, Livingston, and John J. Ventura,
East Brunswick, N.J., assignors to M & T Chemicals
Inc., New York, N.Y., a corporation of Delaware
No Drawing. Filed Apr. 24, 1964, Ser. No. 362,464
14 Claims. (Cl. 260—446)

*Novel product and process*

This invention relates to a novel process for preparing organoantimony compounds.

Organoantimony compounds of the formula $$R_2SbOOCR'$$

wherein R is a hydrocarbon group and OOCR' is an anionic carboxylate group may be employed as stabilizers, bactericides, germicides, etc. Such compounds have not, however, enjoyed wide commercial use because of a lack of a convenient method for preparing them in high yield and purity. Typical prior art techniques require a number of costly and difficult-to-handle intermediates, such as organomagnesium reagents, organolithium reagents, etc. Other prior art techniques involve complicated techniques or are characterized by low yields.

It is an object of this invention to provide a novel process characterized by its ability to produce high yields of high purity diorganoantimony carboxylate compounds. Other objects will become apparent to those skilled in the art upon reading the following disclosure.

In accordance with certain of its aspects, the process of this invention for preparing a diorganoantimony compound of the formula $R_2SbOOCR'$ wherein R and R' are selected from the group consisting of alkyl, aryl and alkenyl, comprises mixing together as reactants $RSbX_2$ wherein X is halogen having an atomic weight greater than 19; and $M(OOCR')_a$ wherein M is a cation selected from the group consisting of ammonium, alkali metals and alkaline earth metals, and $a$ is the valence of M; in the presence of an inert solvent for at least one of said reactants, thereby forming product $R_2SbOOCR'$; and recovering said product.

In accordance with this invention, $R_2SbOOCR'$ may be prepared by reacting together $RSbX_2$ and $M(OOCR')_a$; wherein R and R' are selected from the group consisting of alkyl, aryl, and alkenyl. Typical alkyls may include methyl, ethyl, n-propyl, isopropyl, n-butyl, isobutyl, sec-butyl, tert-butyl, amyl, hexyl, octyl, decyl, dodecyl, octadecyl, cyclohexyl, cycloheptyl, etc. Typical aryls may include phenyl, naphthyl, phenanthryl, etc. Typical alkenyls may include vinyl, allyl, 1-propenyl, 1-butenyl, 2-butenyl, 3-butenyl, etc. The radicals R and R' may be inertly substituted alkyl, aryl, or alkenyl radical, i.e. may bear a substituent which does not react with other components of the process or interfere with the reaction. Typical inert substitutents may include halogen, nitro, ether, aryl, alkyl, etc. Typical inertly substituted R and R' radicals may include chlorophenyl, nitrophenyl, benzyl, tolyl, ethylphenyl, phenylethyl, chlorobutyl, 2-ethylhexyl, ethoxyethyl, methylcyclohexyl, 4-chloro-3-butenyl, etc. R and R' may be the same or different. Preferably, R may be aryl and most preferably it may be phenyl. Preferably R' may be lower alkyl, i.e. alkyl having less than 10 carbon atoms and most preferably R' may be methyl.

In the reactant $R_2SbX_2$, X may be halogen having an atomic weight greater than 19, e.g. chlorine, bromine and iodine. Most preferably, X may be chlorine.

Typical $RSbX_2$ reactants which may be employed in practice of this invention include phenylantimony dichloride, tolylantimony dibromide, butylantimony diiodide, benzylantimony dichloride, cyclohexylantimony dibromide, allylantimony diiodide, chlorophenylantimony dichloride, octylantimony dibromide, etc. Preferably R may be aryl, most preferably phenyl, and X may be chlorine, and the reactant $RSbX_2$ may be phenylantimony dichloride.

These compounds may be readily available, or they may be readily prepared. For example, three moles of Grignard reagent RMgCl, say phenylmagnesium chloride, may be reacted with one mole of $SbCl_3$ to give $R_3Sb$, say triphenylantimony. One mole of $R_3Sb$ may then be reacted with two moles of $SbCl_3$ to give $RSbCl_2$, say phenylantimony dichloride. It is a particular advantage of this invention that it may permit preparation of $R_2SbOOCR'$ without the necessity of preparing costly organometallic intermediates such as Grignard reagents, since the reactant $RSbX_2$ may be prepared by reacting a diazonium halide, typically phenyldiazonium chloride, with $SbX_3$, typically antimony trichloride, and decomposing the resulting compound with zinc dust to give $RSbX_2$, typically phenylantimony dichloride.

$RSbX_2$ may be reacted with $M(OOCR')_a$ wherein R' is independently selected from the same group as R; M is a cation selected from the group consisting of ammonium, alkali metals and alkaline earth metals; and $a$ is the valence of M. M may be ammonium, sodium, potassium, lithium, calcium, magnesium, strontium, etc. Preferably M may be ammonium, sodium, or potassium.

In the compound $M(OOCR')_a$, R' may be selected from the group consisting of alkyl, aryl and alkenyl and $a$ may be the valence of M. Typical illustrative $$M(OOCR')_a$$

reactants may include:

ammonium acetate
sodium acetate
potassium acetate
calcium acetate
magnesium acetate
ammonium propionate
sodium butyrate
potassium α-methylpropionate
calcium 2-ethylhexanoate
magnesium valerate
sodium caproate
ammonium α-methylvalerate
potassium caprylate
magnesium laurate
calcium stearate
potassium oleate
ammonium benzoate
magnesium p-toluate
sodium-ethylbenzoate
calcium α-naphthoate
ammonium phenylacetate
sodium phenoxyacetate
potassium linoleate
calcium cyclohexanoate
magnesium tetrachlorobenzoate
sodium pelargonate Other suitable reactants are those derived from commercial carboxylic acids, e.g. sodium tallate, ammonium rosinate, etc. The compound $M(OOCR')_a$ may be employed in the form of anhydrous material, hydrate, e.g. sodium acetate trihydrate, etc. It may be added to the reaction mixture *qua* salt or it may be formed in the reaction mixture by separately adding the appropriate base, e.g. ammonium hydroxide, sodium carbonate, sodium hydroxide, etc., and the appropriate acid, e.g. acetic acid, benzoic acid, etc.

The reaction which occurs in the process of this invention may be represented as (I) $RSbX_2 + M(OOCR')_a \rightarrow R_2SbOOCR' + MX_a + Sb_2O_3$ Depending upon the ratio of reactants and conditions used, the by-product produced may be of the form $Sb(OOCR')_3$ rather than $Sb_2O_3$ or mixture of both may be obtained.

A specific, preferred embodiment of the process may be represented as (II) 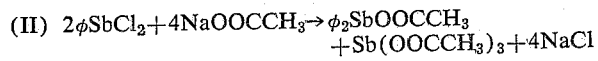

Preferably, $RSbX_2$ and $M(OOCR')_a$ may be reacted by mixing them together in the presence of an inert solvent for at least one of said reactants. An inert solvent is one which does not react with either of the reactants under the reaction conditions or otherwise interfere with the preparation. Preferably, the inert solvent may have a boiling point of about 60–150° C. at atmospheric pressure. The inert solvent may typically be employed in the amount of about 150–2,500 parts by weight per 100 parts by weight, say 1,000 parts by weight per 100 parts by weight of total reactants.

Where the reactant $M(OOCR')_a$ is water-soluble, e.g. when M is ammonium, sodium or potassium and R' is lower alkyl or aryl, the inert solvent may preferably be water. When water is employed, product $R_2SbOOCR'$ may be precipitated from solution as formed, and by-products $MX_a$ and $Sb(OOCR')_3$ may be retained in solution. If conditions are such that $Sb_2O_3$ is formed as by-product, this may also be precipitated from the solvent during the reaction. However, product $R_2SbOOCR'$ may be separated from $Sb_2O_3$ by extracting the former with a suitable organic solvent, say cyclohexane. Thus, the use of water as the inert solvent may be desirable because of the ease with which the product may be recovered.

If desired, the inert solvent may be an inert organic solvent such as benzene, toluene, xylene, tetrahydrofuran, methanol, hexane, heptane, ligroin, petroleum ether, cyclohexane, etc. When inert organic solvents are employed, by-products $MX_a$ and $Sb_2O_3$ may typically be precipitated from solution and product $R_2SbOOCR'$ may be recovered by filtering off by-product, stripping the solvent from the filtrate, preferably under reduced pressure, and distilling or recrystallizing the residue.

Preferably, the reactants may be mixed together in the molar ratio of about $1/a$ to $4/a$ moles of $M(OOCR')_a$ per mole of $RSbX_2$. For example, when $a$ is 1, $$M(OOCR')_a$$

may be employed in the ratio of about 1–4 moles per mole of $RSbX_2$. When M is divalent, e.g. calcium, and $a$ is 2, $M(OOCR')_a$ may be employed in the ratio of about 0.5–2 moles per mole of $RSbX_2$. Lower amounts may be used, but the yield of product may be decreased thereby. Larger amounts may also be employed but little or no evident additional advantage may be obtained thereby. The reaction may be conveniently carried out at relatively low temperatures, typically 20–150° C. and may be substantially complete in about 0.5–20 hours.

During the reaction and isolation of the product, it may be desirable to maintain an inert atmosphere, typically nitrogen or refluxing inert organic solvent, to prevent undesirable oxidation reactions. In particular, the alkylantimony and alkenylantimony compounds may react readily with oxygen and may, therefore, require an inert atmosphere.

The product $R_2SbOOCR'$ may be recovered as a liquid, oil or solid, depending upon the particular reactants and conditions chosen. It may typically be recovered from the reaction in high yields. The reaction may give product of relatively high purity, which may be further purified, if desired, by distillation, recrystallization from an organic solvent such as toluene, cyclohexane, etc.

Illustrative products which may be prepared in accordance with this invention include:

diphenylantimony acetate
diphenylantimony propionate
diphenylantimony butyrate
ditolylantimony α-methylpropionate
dixylylantimony α-methylpropionate
di-α-naphthylantimony acetate
ditolylantimony butyrate
bis(p-chlorophenyl) antimony γ-chlorobutyrate
diphenylantimony β-ethoxypropionate
diethylantimony acetate
di-n-propylantimony propionate
di-n-butylantimony α-methylpropionate
di-n-octylantimony propionate
dilaurylantimony butyrate
bis(2-ethylhexyl) antimony α-methylpropionate
di-n-hexylantimony acetate
diallylantimony acetate
di-2-butenylantimony propionate
dibenzylantimony α-methylpropionate
dicyclohexylantimony acetate
diphenylantimony butyrate
diphenylantimony valerate
diphenylantimony caproate
ditolylantimony α-methylvalerate
dixylylantimony β-methylvalerate
diethylantimony α-ethylcaproate
di-n-propylantimony caprylate
di-n-butylantimony caprate
di-α-naphthylantimony pelargonate
di-n-octylantimony laurate
dilaurylantimony stearate
di-2-ethylhexylantimony oleate
di-n-hexylantimony benzoate
diallylantimony p-toluate
di-2-butenylantimony p-ethylbenzoate
dibenzylantimony α-naphthoate
dicyclohexylantimony phenylacetate
diphenylantimony phenoxyacetate
diphenylantimony linoleate
ditolylantimony cyclohexanoate
diphenylantimony tetrachlorobenzoate
diphenylantimony tallate
ditolylantimony rosinate
bis(p-chlorophenyl) antimony pelargonate
diphenylantimony p-chlorobenzoate The products prepared by the process of this invention have a high degree of biological activity and may be used as bactericides, fungicides, etc. For example, diphenylantimony acetate may control the growth of such organisms as *Staphylococcus aureus, Aerobacter aerogenes, Candida albicans,* etc.

The following examples illustrate practice of this novel invention according to certain of its embodiments.

*Example 1.—Diphenylantimony acetate* 

$$2\phi SbCl_2 + 4NaOOCCH_3 \rightarrow \phi_2SbOOCCH_3 \\ +4NaCl+Sb(OOCCH_3)_3$$

136.1 grams (1.0 mole) of sodium acetate trihydrate was dissolved in 2,500 ml. of 95% ethanol. This solution was heated to reflux and a second solution of 135 grams (0.5 mole) of phenylantimony dichloride in 500 ml. of ethanol was added thereto over a period of about 100 minutes. After the addition was complete, the reaction mixture was refluxed for an additional 1.5 hours. During the course of the reaction, the inorganic antimony by-product precipitated. This by-product was filtered off and the filtrate stripped to dryness on a rotary film evaporator to give 125 grams of white solids. The solids were extracted with one liter of benzene. Evaporation of the benzene extract yielded 62 grams (74% of theory) diphenylantimony acetate, melting point 128–131° C. The composition of the product was verified by a mixed melting point with authentic diphenylantimony acetate.

*Example 2.—Diphenylantimony p-chlorobenzoate*
$$\phi_2SbOOCC_6H_4Cl$$

$$2\phi SbCl_2+4NaOOCC_6H_4Cl \rightarrow \phi_2SbOOCC_6H_4Cl \\ +Sb(OOCC_6H_4Cl)_3+4NaCl$$

178.5 grams (1.0 mole) of sodium p-chlorobenzoate may be dispersed in 1000 ml. of isopropanol and heated to reflux. A separate solution of 135 grams (0.5 mole) of phenylantimony dichloride in 500 ml. of isopropanol may be added thereto over a period of about 75 minutes, and the resulting mixture refluxed with stirring for an additional 4.5 hours. At the end of this time, the mixture may be filtered hot to remove inorganic by-products and product diphenylantimony p-chlorobenzoate may be recovered by cooling the filtrate to induce crystallization.

*Example 3.—Di-n-octylantimony p-chlorobenzoate*
$(C_8H_{17})_2SbOOCC_6H_4Cl$ $2C_8H_{17}SbCl_2 + 4NaOOCC_6H_4Cl \rightarrow (C_8H_{17})_2SbOOC_6H_4Cl + Sb(OOCC_6H_4Cl)_3 + 4NaCl$ 153 grams (0.5 mole) of octylantimony dichloride, 178.5 grams (1.0 mole) of sodium p-chlorobenzoate, and 1000 ml. of benzene may be mixed together, heated to reflux, and refluxed with stirring for 5 hours. The mixture may then be filtered hot to remove inorganic by-products, and the filtrate stripped of benzene under vacuum to give product di-n-octylantimony p-chlorobenzoate in high yield.

As may be seen from these illustrative examples, practice of this invention provides a highly convenient technique which permits attainment of high yields of the desired products.

Although this invention has been illustrated by reference to specific examples, numerous changes and modifications thereof which clearly wall within the scope of the invention will be apparent to those skilled in the art.

We claim:
1. The process for preparing a diorganoantimony compound of the formula $R_2SbOOCR'$ wherein R and R' are selected from the group consisting of alkyl, aryl, and alkenyl, which comprises mixing together as reactants $RSbX_2$ wherein X is halogen having an atomic weight greater than 19; and $M(OOCR')_a$ wherein M is a cation selected from the group consisting of ammonium, alkali metals and alkaline earth metals and $a$ is the valence of M; in the presence of an inert solvent for at least one of said reactants, thereby forming product $R_2SbOOCR'$; and recovering said product.
2. The process of claim 1 wherein R is aryl.
3. The process of claim 1 wherein R is phenyl.
4. The process of claim 1 wherein R' is lower alkyl.
5. The process of claim 1 wherein R' is methyl.
6. The process of claim 1 wherein X is chlorine.
7. The process of claim 1 wherein said inert solvent has a boiling point of 60–150° C.
8. The process of claim 1 wherein said inert solvent is water.
9. The process for preparing a diorganoantimony compound of the formula $R_2SbOOCR'$ wherein R is aryl and R' is selected from the group consisting of alkyl, aryl, and alkenyl, which comprises mixing together as reactants $RSbCl_2$ and $M(OOCR')_a$ wherein M is a cation selected from the group consisting of ammonium, alkali metals and alkaline earth metals and $a$ is the valence of M; in the ratio of $1/a$–$4/a$ moles of $RSbCl_2$ per mole of $M(OOCR')_a$; in the presence of an inert solvent for at least one of said reactants which solvent has a boiling point of 60–150° C., thereby forming a reaction mixture; maintaining said reaction mixture at a temperature of 20–150° C., thereby forming product $R_2SbOOCR'$; and recovering said product.
10. The process of claim 9 wherein R is phenyl.
11. The process of claim 9 wherein R' is lower alkyl.
12. The process of claim 9 wherein M is sodium.
13. The process of claim 9 wherein M is potassium.
14. The process of claim 9 wherein M is ammonium.

References Cited

UNITED STATES PATENTS 3,031,425   4/1962   Schoepfle et al. _____ 260—446

TOBIAS E. LEVOW, *Primary Examiner.*

W. F. W. BELLAMY, *Assistant Examiner.*